F. B. STEVENS.
DEVICES FOR PACKING CONDENSER-TUBES.
No. 173,189. Patented Feb. 8, 1876.
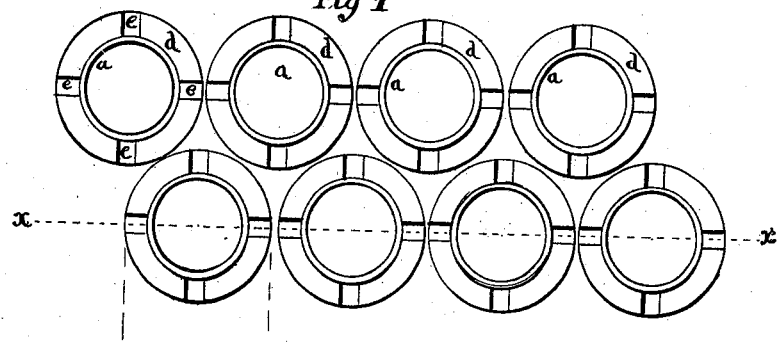
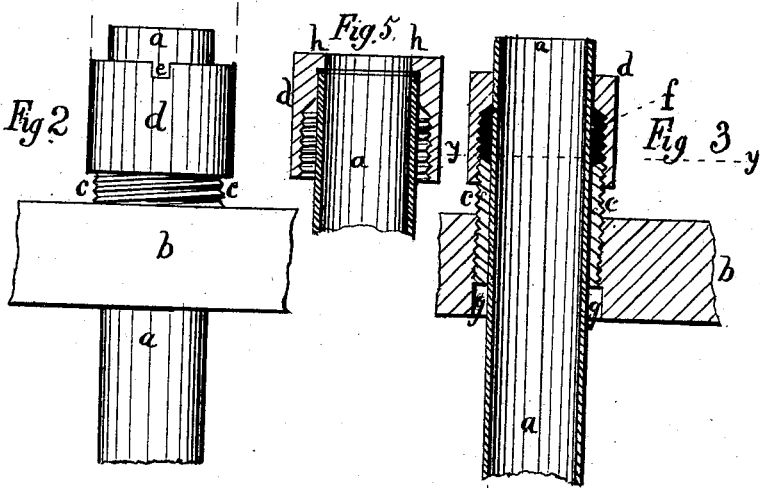
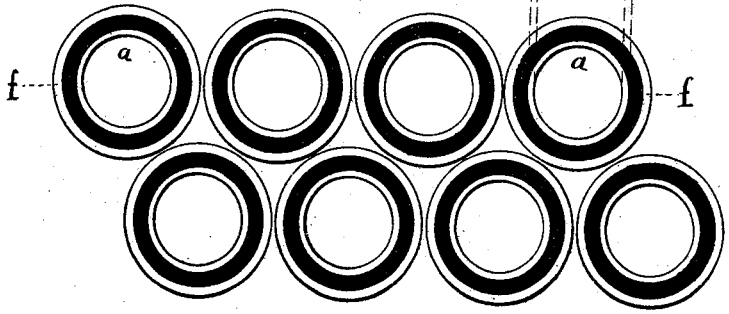
Witnesses
Robt Coffin
L. W. Brown
Inventor
Francis B. Stevens.

UNITED STATES PATENT OFFICE.

FRANCIS B. STEVENS, OF HOBOKEN, NEW JERSEY.

IMPROVEMENT IN DEVICES FOR PACKING CONDENSER-TUBES.

Specification forming part of Letters Patent No. 173,189, dated February 8, 1876; application filed May 14, 1875.

*To all whom it may concern:*

Be it known that I, FRANCIS B. STEVENS, of Hoboken, New Jersey, have invented an Improvement in Surface-Condensers, of which the following is a specification:

The object of my invention is to secure and pack the tubes in the heads of surface-condensers in such manner that these tubes can be properly secured and packed; and that they can also be unpacked and removed quickly and without injury.

The accompanying drawing illustrates my invention.

Figure 1 shows a plan view of my improvement applied to eight tubes of a condenser-head. Fig. 2 shows a vertical view of one tube in its position in the condenser-head. Fig. 3 shows a vertical section of one tube in its position in the condenser-head, taken through the dotted line $x\ x$ of Fig. 1. Fig. 4 shows a horizontal section of the tubes shown in Fig 1, taken through the dotted line $y\ y$ of Fig. 3. Fig. 5 shows a section of the gland $d$, with a small inner projection, $h\ h$, to keep the tube from creeping or moving in the condenser-head.

A common way of packing condenser-tubes is by means of a small stuffing-box and gland around each end of each tube, this stuffing-box being formed by a recess sunk in the condenser-head, and having in this recess a female screw, into which a gland is screwed to tighten the packing—the hole at the bottom of the recess fitting the tube.

My improvement consists in so enlarging the tube-holes in the condenser-heads that hollow bolts can be screwed firmly into them—the tubes passing through these hollow screw-bolts—and in making female screws on the glands fitting the male screws on the hollow screw-bolts, and in making recesses in the glands to contain the packing, this packing being compressed around the tubes by screwing the glands onto the hollow screw-bolts.

In the figures mentioned above, $a\ a$ show condenser-tubes. $b\ b$ shows a portion of a condenser-head. $c\ c$ show the hollow screw-bolts, through which the tubes pass. $d\ d$ show the glands containing the packing $f f$ in their recesses, and having female screws cut in these recesses. $e\ e$ show notches in the glands for the insertion of a screw-driver. $g\ g$ show the tube-holes enlarged to receive the hollow bolts $c\ c$. The packing $f f$ being contained in the glands $d\ d$ is compressed around the tubes $a\ a$ by screwing the glands $d\ d$ on the hollow screw-bolts $c\ c$.

This packing can be removed by simply unscrewing the glands; and the difficulty of drawing the tubes out of the condenser-heads, when the tubes have been enlarged by incrustation, is obviated by unscrewing and removing the hollow screw-bolt $c\ c$.

If the tubes are not packed hard, glands, as shown in Fig. 5, with an inner rim, $h\ h$, can be used to keep the tubes from creeping or moving through the heads.

The packing $f f$ can be of rubber, wood, hemp, or other material usually used for packing.

I claim as my invention—

A surface-condenser having tubes, each of which is packed by a gland, recessed so as to hold the packing, and screwed by an internal screw over the hollow standing bolts $c\ c$, to tighten this packing.

FRANCIS B. STEVENS.

Witnesses:
ROBT. COFFIN,
L. W. BROWN.